United States Patent
Rossomando et al.

(10) Patent No.: US 10,940,986 B2
(45) Date of Patent: Mar. 9, 2021

(54) BIODEGRADABLE CONTAINER OR CAPSULE

(71) Applicant: Matteo Rossomando, Rome (IT)

(72) Inventors: Matteo Rossomando, Rome (IT); Giulio Tomassini, Rome (IT); Maria Grazia Tiberti, Rome (IT)

(73) Assignee: Matteo Rossomando, Rome (IT)

( * ) Notice: Subject to any disclaimer, the term of this patent is extended or adjusted under 35 U.S.C. 154(b) by 0 days.

(21) Appl. No.: 15/308,998

(22) PCT Filed: May 5, 2015

(86) PCT No.: PCT/IT2015/000123
§ 371 (c)(1),
(2) Date: Nov. 4, 2016

(87) PCT Pub. No.: WO2015/170358
PCT Pub. Date: Nov. 12, 2015

(65) Prior Publication Data
US 2017/0081096 A1    Mar. 23, 2017

(30) Foreign Application Priority Data

May 7, 2014   (IT) .............................. RM2014A0226
Mar. 5, 2015  (IT) ........................ 102015000007574

(51) Int. Cl.
   *B65D 85/804*   (2006.01)
   *B65D 65/46*    (2006.01)
   *B65D 25/02*    (2006.01)

(52) U.S. Cl.
   CPC ........... *B65D 65/466* (2013.01); *B65D 25/02* (2013.01); *B65D 85/8043* (2013.01); *Y02W 90/10* (2015.05)

(58) Field of Classification Search
   CPC .. B65D 85/8043; B65D 65/466; B65D 25/02; B65D 85/804; B65D 85/8046
   See application file for complete search history.

(56) References Cited

U.S. PATENT DOCUMENTS

2004/0115310 A1* 6/2004 Yoakim .............. B65D 85/8043
                                                   426/77
2010/0288131 A1* 11/2010 Kilber ................. A47J 31/0673
                                                   99/295
(Continued)

FOREIGN PATENT DOCUMENTS

CN    102282083       12/2011
CN    102596733 A      7/2012
(Continued)

OTHER PUBLICATIONS

International Search Report and Written Opinion for PCT/IT2015/000123, dated Dec. 7. 2015.
(Continued)

*Primary Examiner* — Ericson M Lachica

(57) ABSTRACT

The invention concerns a biodegradable container (1) for single dose or multi-dose administration of beverages by injecting a fluid solution, under pressure through a preparation, said biodegradable container (1) comprising: a body (2) having a base (21), a side wall (22) and an opening (23) opposite to said base (21), said body (2) forming a chamber for containing said preparation; and an upper part (3) coupled to said body (2) in such a way as to obstruct said opening (23) and prevent the escape of said preparation, said biodegradable container (1) being characterized by comprising reinforcement means (4) associated with said side wall (22), and configured to oppose resistance to pressure acting on said biodegradable container (1) during the injection of said fluid solution under pressure.

15 Claims, 12 Drawing Sheets

(56) References Cited

U.S. PATENT DOCUMENTS

| | | | | |
|---|---|---|---|---|
| 2010/0307930 | A1* | 12/2010 | Zangerle | B65D 85/8043 206/0.5 |
| 2011/0041702 | A1* | 2/2011 | Yoakim | B65D 85/8043 99/302 R |
| 2011/0064852 | A1* | 3/2011 | Mann | B65D 85/8043 426/78 |
| 2011/0142996 | A1* | 6/2011 | Kruger | B65B 29/022 426/80 |
| 2011/0186450 | A1* | 8/2011 | Bonacci | A47J 31/369 206/219 |
| 2012/0097602 | A1 | 4/2012 | Tedford | |
| 2012/0121765 | A1* | 5/2012 | Kamerbeek | A47J 31/0673 426/77 |
| 2013/0045308 | A1 | 2/2013 | Gorbatenko | |
| 2013/0095212 | A1* | 4/2013 | Beer | B65D 85/8043 426/80 |
| 2013/0156897 | A1* | 6/2013 | Goldstein | B65D 85/8043 426/115 |
| 2014/0083873 | A1* | 3/2014 | Capitani | B65D 85/8043 206/0.5 |
| 2016/0159562 | A1* | 6/2016 | Macchiavelli | B65D 85/8043 426/115 |

FOREIGN PATENT DOCUMENTS

| | | |
|---|---|---|
| CN | 102356030 | 4/2014 |
| CN | 103917462 | 7/2014 |
| CN | 104284848 | 10/2016 |
| EP | 2573008 A1 | 3/2013 |
| EP | 2573008 A1 | 3/2013 |
| GB | 2498449 A | 7/2013 |
| WO | 2011027259 A1 | 3/2011 |
| WO | WO-2013/046189 A1 | 4/2013 |
| WO | 2014012778 A2 | 1/2014 |
| WO | WO-2014/006527 A2 | 1/2014 |
| WO | WO 2015/011689 | 1/2015 |

OTHER PUBLICATIONS

Search Report in corresponding IT Application RM20140226, dated Jan. 30. 2015.
European Search Report dated Apr. 20, 2018.
Notification of Office Action and Search Report dated Feb. 11, 2019 From the State Intellectual Property Office of the People's Republic of China Re. Application No. 201580056568.2 and Its Translation of Office Action Into English. (19 Pages).
Notification of Office Action and Search Report dated May 30, 2018 From the State Intellectual Property Office of the People's Republic of China Re. Application No. 201580023942.4. (6 Pages).

* cited by examiner

BIODEGRADABLE CONTAINER OR CAPSULE

CROSS-REFERENCE TO RELATED APPLICATIONS

This application is a National Stage of International Application No. PCT/IT2015/000123, filed May 5, 2015, and claims the benefit of IT RM2014A000226, filed May 7, 2014 and IT 102015000007574, filed Mar. 5, 2015. The entire disclosures of each of the above applications are incorporated herein by reference.

The present invention relates to a biodegradable container or capsule.

More specifically, the invention concerns a biodegradable container or capsule for single-dose or multi-dose administration of hot or cold beverages, such as coffee, the, tisanes, carbonated beverages, ecc.

At present, containers are known for single-dose or multi-dose administration beverages, also known as capsules, containing preparation necessary to make desired beverage.

Capsules are use in suitable machines for administration beverages (said machines being well known in the field).

Machines for administration beverages inject under pressure a fluid solution within the capsule under pressure, thus realizing the specific beverage.

Typically, to prepare and dispense the beverage, a fluid solution is injected within the capsule under a pressure of about 20 atm and for a period varying between 15 and 90 seconds.

Therefore, available capsules are mainly comprised of mineral origin or synthetic materials, such as aluminum and plastics, ensuring that the same capsule has necessary mechanical features to withstand to mechanical stresses, and particularly to pressure to which it is subjected during its use.

As it is well known, said capsules are disposable and once used within the beverage administration machine become wastes difficult to dispose in view of the material comprising the same.

Food containers are also known comprised of biodegradable materials, such as paper or other materials deriving from wood. Biodegradability is the capacity of organic substances to be decomposed in nature, or better to be decomposed by friendly bacteria.

Particularly, a decomposable (or biodegradable) material is attached by some bacteria extracting enzymes necessary to decompose them into simple products, so that element can be completely absorbed by environment.

Therefore, biodegradable containers, e.g. comprised of pressed paper, can be easily disposed of. However, they have mechanical features not suitable to be used in beverage administration machines, particularly to be used with a fluid solution under pressure.

In view of the above, it is an object of the present invention that of overcoming the above drawbacks, and particularly, that of realizing a biodegradable container or capsule for single-dose or multi-dose administration of beverages having mechanical features suitable to be used with beverage administration machines.

It is therefore specific object of the present invention a biodegradable container for single dose or multi-dose administration of beverages by injecting a fluid solution, under pressure through a preparation, said biodegradable container comprising:

a body having a base, a side wall and an opening opposite to said base, said body forming a chamber for containing said preparation; and an upper part coupled to said body in such a way as to obstruct said opening and prevent the escape of said preparation, said biodegradable container comprising reinforcement means associated with said side wall, and configured to oppose resistance to pressure acting on said biodegradable container during the injection of said fluid solution under pressure.

Preferably, according to the invention, said pressure can act on the biodegradable container from inside and/or from outside.

Particularly, according to the invention, said reinforcing means can externally wrap around said side wall and/or said base and/or said upper part.

More particularly, said side wall, and/or said base, and/or said upper part, can present recesses for housing said reinforcement means.

Further, said side wall can be made up of multilayer material, and said reinforcing means can be contained between two layers of said multilayer material, wrapping externally at least one layer of said side wall.

Still, said reinforcing means can be made by at least one biodegradable thread-like element or at least one biodegradable strip spirally wound around said side wall, starting from an area adjacent to said opening up to said base, said at least one thread-like element or said at least one strip containing the expansion of said side wall during the injection of said pressurized fluid solution in said biodegradable container.

More specifically, said reinforcing means are realized using biodegradable gauze, said gauze containing the expansion of said side wall, and/or said base, and/or said upper part, during the injection of said pressurized fluid in said biodegradable container.

More specifically, said reinforcing means can be comprised of a biodegradable sock, said sock containing the expansion of said side wall), and/or said base, and/or said upper part, during the injection of said pressurized fluid solution in said biodegradable container.

Particularly, said lateral body has a plurality of longitudinal folds.

More particularly, said body has been subjected to a grease and waterproofing treatment on the inner surface, and/or external.

Further, said base has a plurality of holes for administration said beverage during the injection of said pressurized fluid solution in said container.

Still, said biodegradable container can comprise a biodegradable bottom filter, arranged inside said body and in proximity to said base, for filtering said beverage and prevent the leakage of said preparation during the injection of said pressurized fluid solution in said biodegradable container.

More specifically, said biodegradable container can comprise a biodegradable end plate arranged internally or externally to said body and in proximity to said base, said bottom being configured to improve the mechanical strength of said base and to adjust the amount of said preparation insertable within said body by reducing, or increasing, its thickness, so as to reduce, or to increase, the net volume of said body.

More in detail, said base can be comprised of multilayer material, and said bottom van be contained between two layers of said multilayer material.

Particularly, said biodegradable container can comprise a biodegradable outer ring, arranged externally to said body and in the vicinity of said opening, for the coupling between said biodegradable container and said upper part.

More particularly, said upper part can have one or more micro-holes for the passage of said fluid solution under pressure.

According to a further embodiment of the biodegradable container of the invention, said reinforcement means, when provided internally, are comprised of radial elements provided, vertically or horizontally, inside the body, preferably a plurality of radial elements, preferably 3, 4, 5, or more, provided according to a cross-configuration inside said body, eventually partially or completely extending along inner height of said body, and eventually having openings along their wall.

Furthermore, said upper part is comprised of a slit upper cardboard, a layer of paper, preferably 40 gr/m$^2$, and of a filter paper layer.

Further, according to the invention, said base is shaped.

Still, according to the invention, a core is provided above, tightened by rings on its upper part.

Always according to the invention, at least a seal 29 is provided above the body of the capsule.

Furthermore, according to the invention, reinforced wall and/or upper part is/are realized separated with respect to the body, and then assembled to the same.

Further, according to the invention, a valve that can be perforated is provided above.

Preferably, according to the invention, a track module is provided, above, or inferiorly, routing water in an even way all along the section to be emulsified, and/or a labyrinth passage is provided, inferiorly, to increase creaminess of the beverage, or vice versa.

Finally, it is an object of the present invention an assembly comprising a biodegradable container as described in the above, and an additional element to be associated in correspondence of said base of said biodegradable container, said additional element comprising a labyrinth passage for forced passage of said beverage from said biodegradable container and at least one opening connected with said labyrinth passage, for administration of said beverage, The invention will be now described, for illustrative, but not limitative, purposes, according to its preferred embodiments, with particular reference to the figures of the enclosed drawings, wherein:

Figure 1:
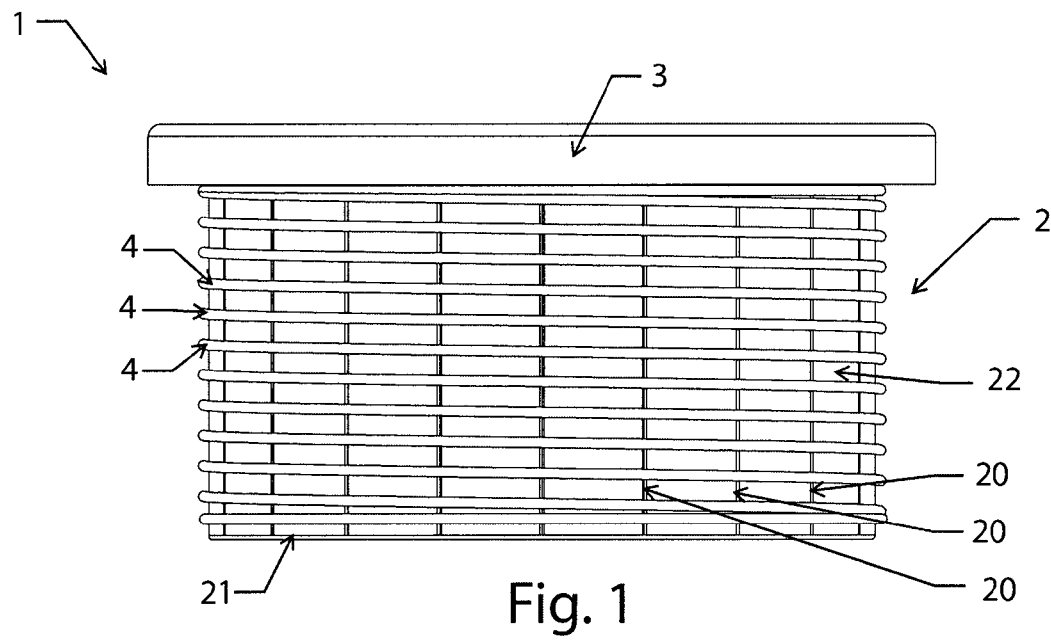
FIG. 1 shows a front view of a first embodiment of biodegradable container or capsule according to the invention.

Making reference to FIG. 1, it is observed a first embodiment of a biodegradable container or capsule according to the invention, generically indicated by reference number 1.

Said biodegradable container or capsule 1 comprises a body 2, having a base 21, a lateral wall 22 and an opening 23 (FIG. 3) opposed with respect to said base 21, thus realizing a chamber to contain a preparation (not shown in the figure) necessary to prepare the desired beverage (coffee, the, tisane, ecc.).

Said body 2 is made up of biodegradable material, such as, for example, paper, pressed paper, paperboard, pressed paperboard, cotton, natural tissues, or other wood derivatives, and it can be comprised of a single layer material, or of a composed multilayer material, e.g. by a first inner paper layer weighing 100 gr/m$^2$, and of a second outer paper layer weighing 110 gr/mm$^2$.

Further, said body 2 can be subjected in different embodiments to a grease-resistant and waterproofing treatment on its inner and/or outer surface.

Said treatment is not present in different embodiments on the outer surface of said body 2, being thus possible gluing it, using non-toxic glues, to other elements realizing said biodegradable container or capsule 1.

Figure 2:
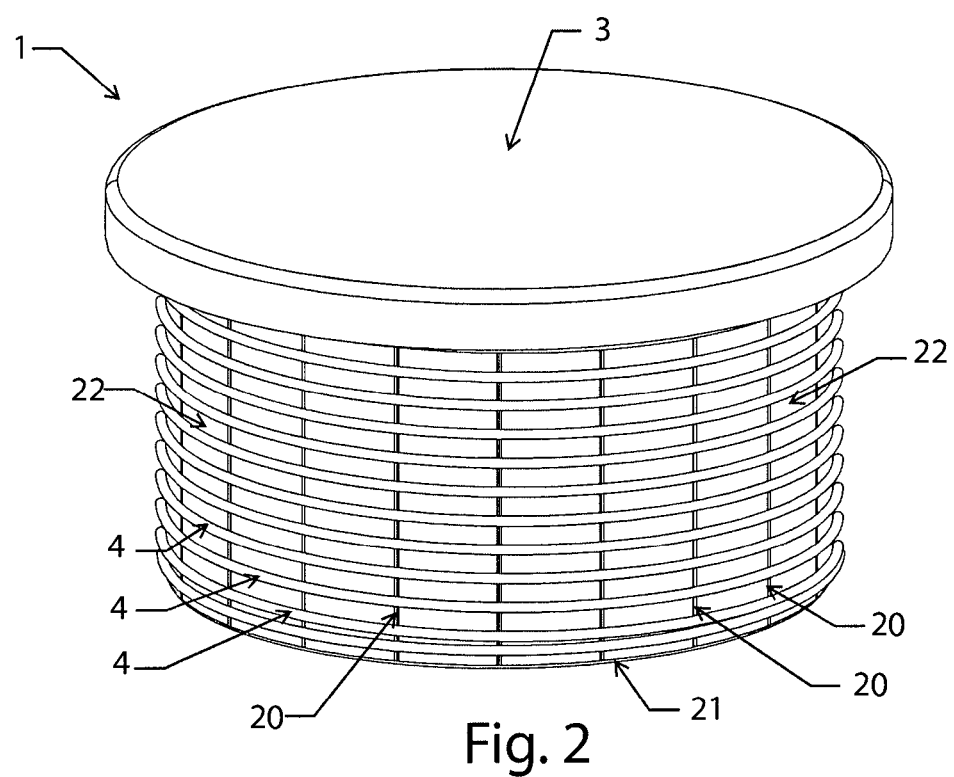
FIG. 2 is an isometric view of a first embodiment of biodegradable container or capsule according to the invention.

Making reference to FIGS. 1 and 2, said body 2 preferably has longitudinal folds 20 to better shaping said body 2 and much easily obtaining a substantially cylindrical figure.

Further, said longitudinal folds 20 give a higher radial elasticity to said body 2, useful to withstand to mechanical stresses such as, for example, pressure generated by fluid solution in beverage administration machines.

Said body 2 can be impermeable or permeable, depending on its final use.

Particularly, when the body is permeable, the fluid solution is injected within said biodegradable container or capsule 1, passes through said preparation, and exits from the entire surface of said body 2.

Said solution is particularly suitable for "long" beverages.

Figure 4:
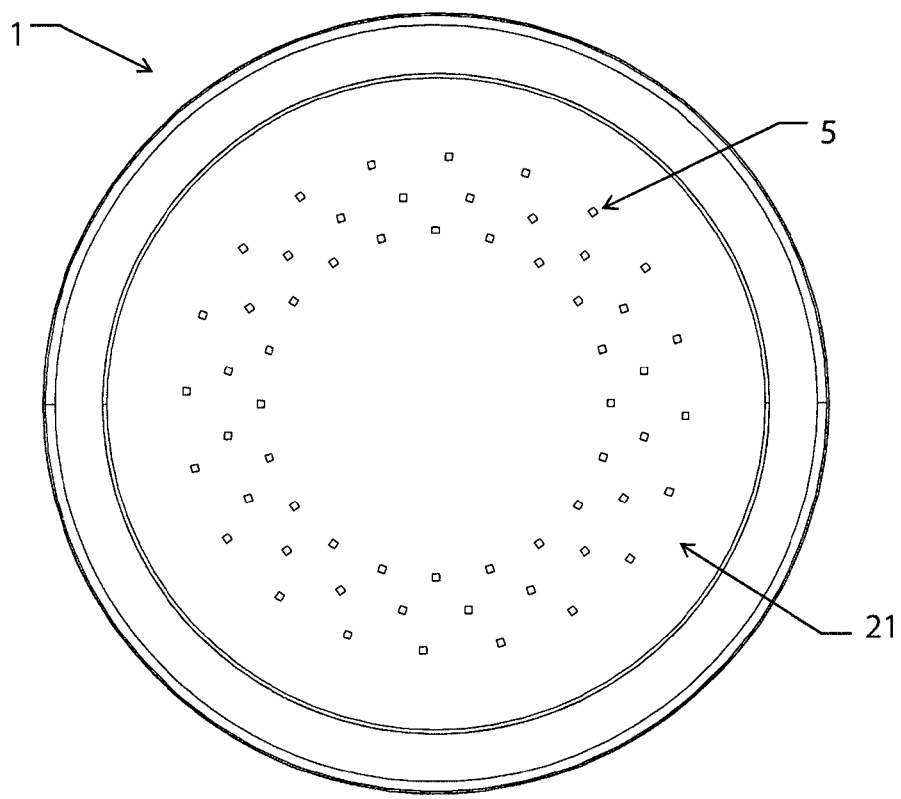
FIG. 4 shows a bottom view of a first embodiment of biodegradable container or capsule according to the invention.

On the contrary, when the body is impermeable, the fluid solution is injected within said biodegradable container or capsule 1, passes through said preparation, and exits from a plurality of holes 5, shown in FIG. 4, suitably realized in said base 21.

Said solution is particularly suitable for "concentrated" beverages.

Only for exemplificative purposes, said plurality of holes 5 can be comprised of 60 holes, each one with a diameter of 0.75 mm.

Figure 3:
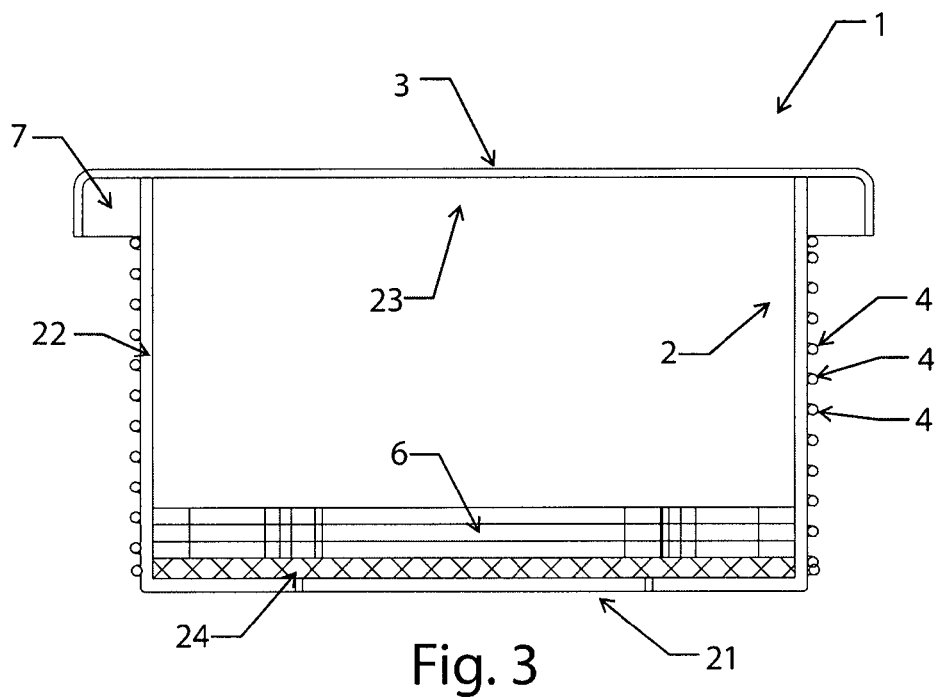
FIG. 3 is a diametral section of a front view of a first embodiment of biodegradable container or capsule according to the invention.

Making reference to FIG. 3, said body 2 provides a bottom 6, permitting improving mechanical resistance of said base 21.

Further, said bottom 6 permits adjusting amount of the preparation that can be inserted within said body 2, reducing, or increasing, its thickness, so as to reduce, or increase, useful volume of said body 2.

Said bottom 6 is made up of biodegradable material, such as paper, pressed paper, paperboard, pressed paperboard, plywood, or other wood derivatives, and can be simply rest on said base 21 or mechanically coupled with the same by, for example, non-toxic glue, welding or other mechanical couplings.

Said bottom 6 can be coupled inside (as shown in the figures) or outside (not shown) said base 21, always making the same function.

If said body 2 is comprised of multilayer material, said bottom 6 can be inserted in correspondence of said base 21 between two layers of the multilayer material.

Figure 14:
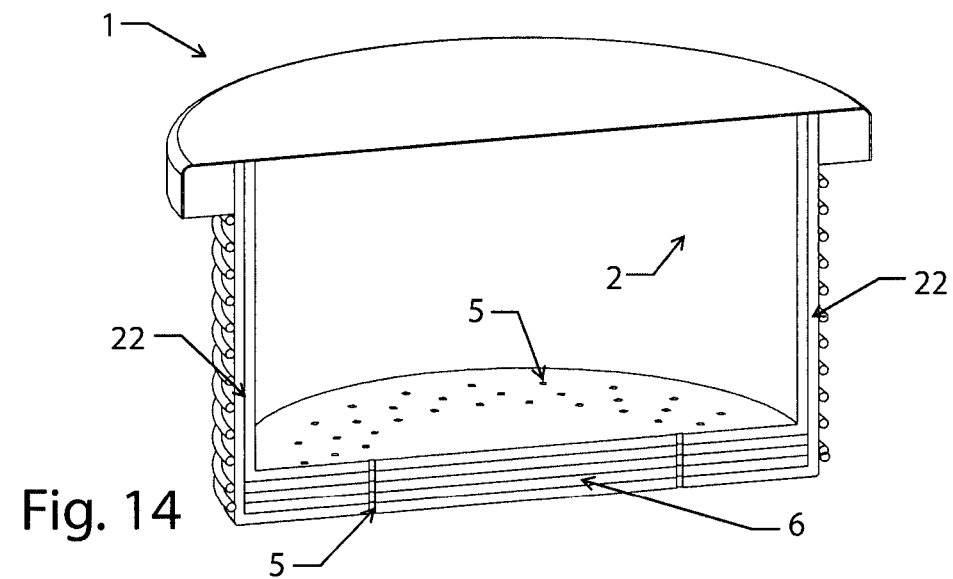
FIG. 14 is an isometric view of a ninth embodiment of biodegradable container or capsule according to the invention.

Further, making reference to FIG. 14, if said base 21 has said plurality of holes 5, said bottom 6 can have such a shape not to interfere with said plurality of holes 5 and/or can have as well a plurality of holes 5.

Furthermore, making reference to FIGS. 6-10, if said base 21 has said plurality of holes 5, said bottom 6 can have such a shape not to interfere with said plurality of holes 5.

Making always reference to FIG. 3, to prevent outlet of said preparation through said plurality of holes of said bottom 6 and/or said plurality of holes 5 of said base 21, a lower filter 24 can be provided, made up of biodegradable material, such as, for example, filter paper, provided between said preparation and/or sand bottom 6 and/or said base 21, so as to filter beverage during its administration, and to maintain said preparation within said body 2.

Further, said lower filter 24 has a flow adjustment role while administering the beverage.

Still making reference to FIG. 3, biodegradable container or capsule 1 has an outer ring 7 in correspondence of said opening 23 and outside said body 2.

Coupling between said outer ring 7 and said body 2 is for example realized by gluing using non-toxic glues, or by other mechanical couplings, as for example represented in FIGS. 6-14.

Said outer ring 7 is made up of biodegradable material such as paper, pressed paper, paperboard, pressed paperboard, vegetable parchment, stratification of vegetable parchment, multilayer wood, plywood, or other derivatives of wood, permitting correctly positioning said biodegradable container or capsule 1 within a beverage administration machine, beside facilitating following ejection operation.

Further, said ring 7 makes it easier coupling between said biodegradable container or capsule 1 and an upper part 3, particularly an upper filter 3.

Said upper filter 3 is made up of biodegradable material such as e.g. filter paper, and is coupled with said biodegradable container or capsule 1 once the latter is filled in with said preparation so as to completely occluding said opening 23 thus preventing outlet of said preparation from said body 2.

Further, said upper filter 3 is permeable to the fluid solution, permitting injection of the same within said body 2 to prepare and administer the beverage.

Figure 5:
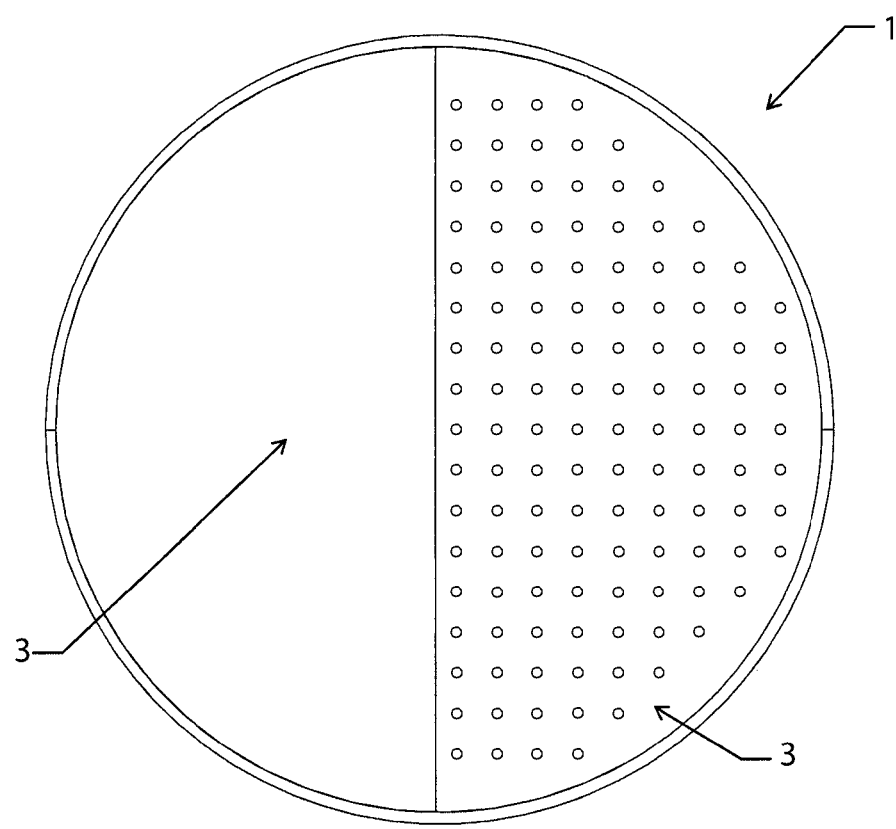
FIG. 5 is a view from above of a first embodiment of biodegradable container or capsule according to the invention.

In order to facilitate said operation, as shown in FIG. 5, said upper filter can have micro holes.

Figure 7:
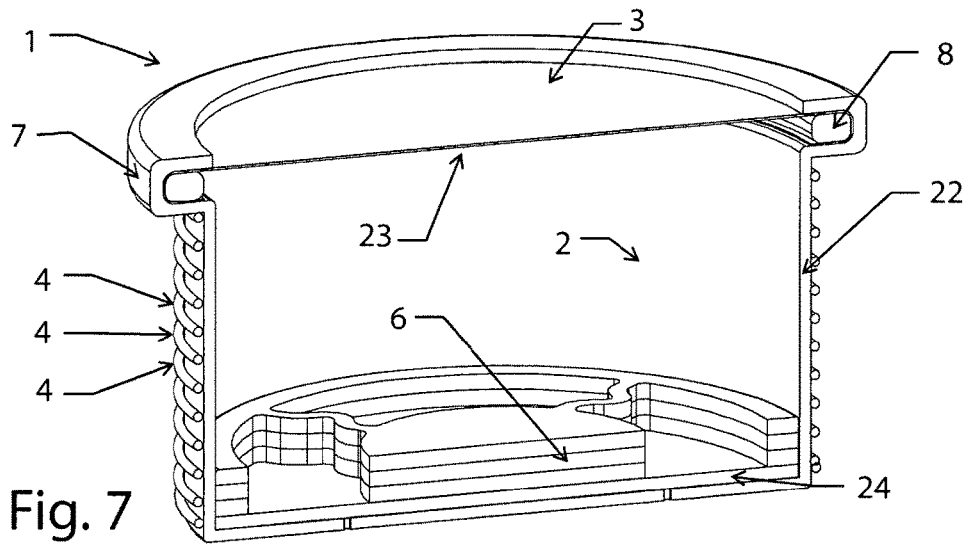
FIG. 7 is an isometric view of a third embodiment of biodegradable container or capsule according to the invention.

In another embodiment, as shown in FIG. 7, said biodegradable container or capsule 1 can have an inner ring 8 in correspondence of said opening 23 and inside said body 2, having the function of improving the mechanical features of said biodegradable container or capsule 1 and to facilitate coupling among said body 2, said outer ring 7 and said upper filter 3.

Making reference to FIGS. 1-3, said biodegradable container or capsule 1 has reinforcement means 4 about said side wall 22.

Said reinforcement means 4 give to said biodegradable container or capsule 1 mechanical resistance features necessary to withstand to stresses, particularly to pressure, to which it is subjected when used inside said beverage administration machines.

Particularly, said reinforcement means 4 are comprised of a filiform element made up of biodegradable material, such as cotton, wound in a spiral around said side wall 22, starting from zone close to said opening 23 up to said base 21.

Thus, said filiform element 4 permits containing expansion of said biodegradable container or capsule 1, and particularly of side wall 22 of said body 2 when administering a beverage, since it is subjected to fluid solution pressure.

Said filiform element 4 can be coupled with said body 2 by methods known in the art.

Only for exemplificative purposes, said filiform element 4 can be coupled to said body 2 by a starting knot (not shown in the figure), within said body 2, and an end knot (not shown in the figure), as well within said body 2, or it can be coupled with said body 2 by gluing employing non-toxic glues, or by another mechanical coupling, or by a combination of said solutions.

Still, said body 2 can have seats (not shown in the figure) to house said filiform element 4.

Figure 11:
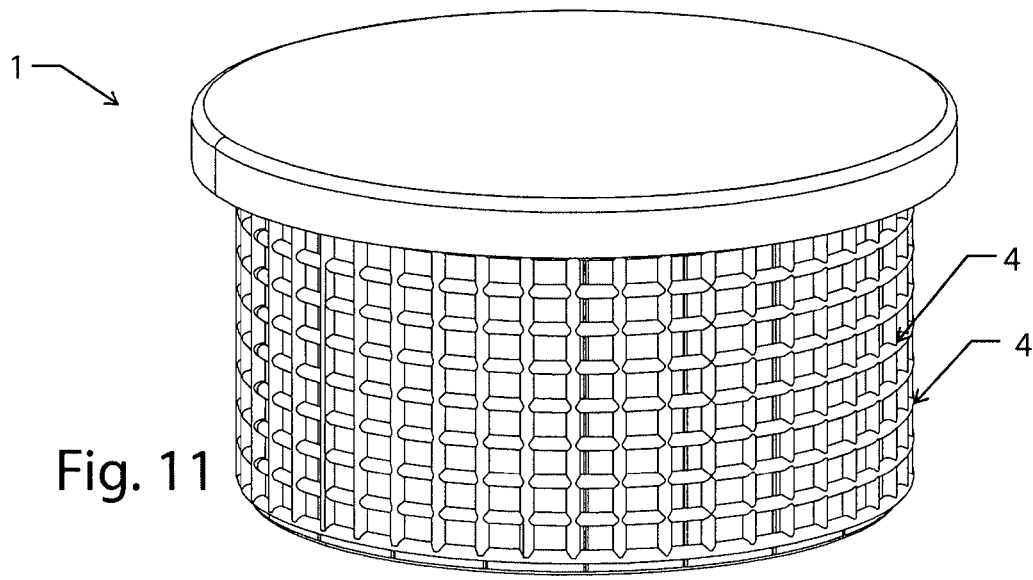
FIG. 11 is an isometric view of a sixth embodiment of biodegradable container or capsule according to the invention.
Figure 12:
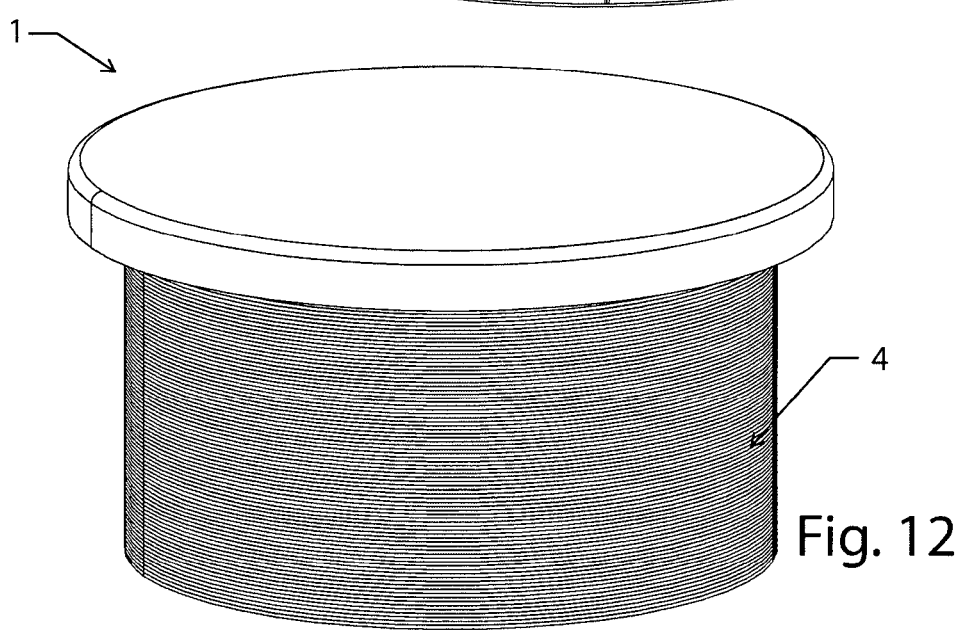
FIG. 12 is an isometric view of a seventh embodiment of biodegradable container or capsule according to the invention.

In other embodiments, as shown in FIGS. 11 and 12, said reinforcement means 4 can be comprised of a gauze, e.g. having a square mesh reticule (FIG. 11) or by a sock (FIG. 12), that can be coupled with said body 2 by mechanical means or by gluing using non-toxic glues, or can envelop said body, exploiting their elasticity, being positioned simply by friction.

Figure 10:
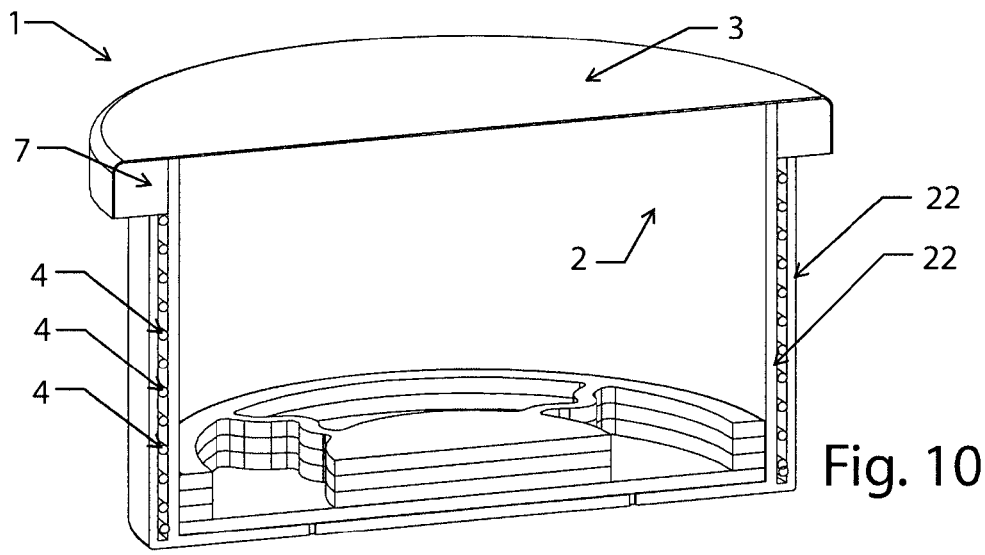
FIG. 10 is an isometric view of a fifth embodiment of biodegradable container or capsule according to the invention.

In other embodiments, as shown in FIG. 10, when said body 2 is comprised of a multilayer material, said reinforcement means 4 can be inserted between two layers of multilayer material, thus realizing a sandwich type material.

Figure 6:
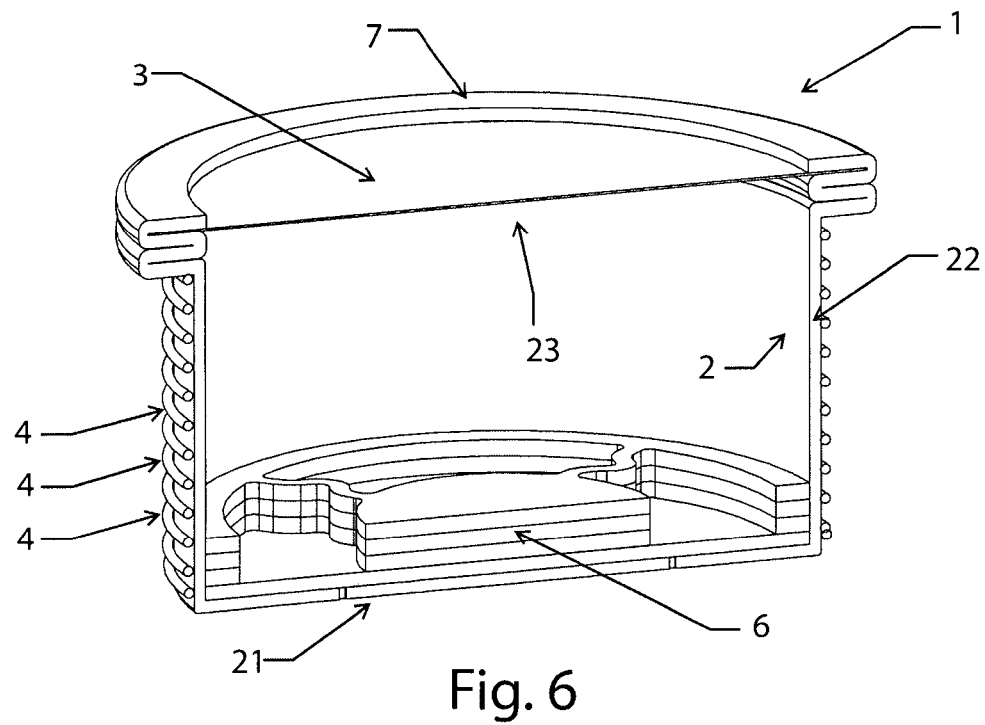
FIG. 6 is an isometric view of a second embodiment of biodegradable container or capsule according to the invention.

Making reference to FIG. 6, it is observed a section isometric view of a second embodiment of said biodegradable container or capsule 1, where said outer ring 7 is realized by folding according to an "accordion" configuration said side wall 22, housing said upper filter 3 within one of said inner folds of said side wall 22.

Making reference to FIG. 7, it is observed a section isometric view of a third embodiment of said biodegradable container or capsule 1, where said outer ring 7 is realized by radially folding said side wall 22 about said reinforcement inner ring 8, where said upper filter 3 is fixed by gluing or mechanical coupling between said reinforcement inner ring 8 and said side wall 22.

Figure 8:
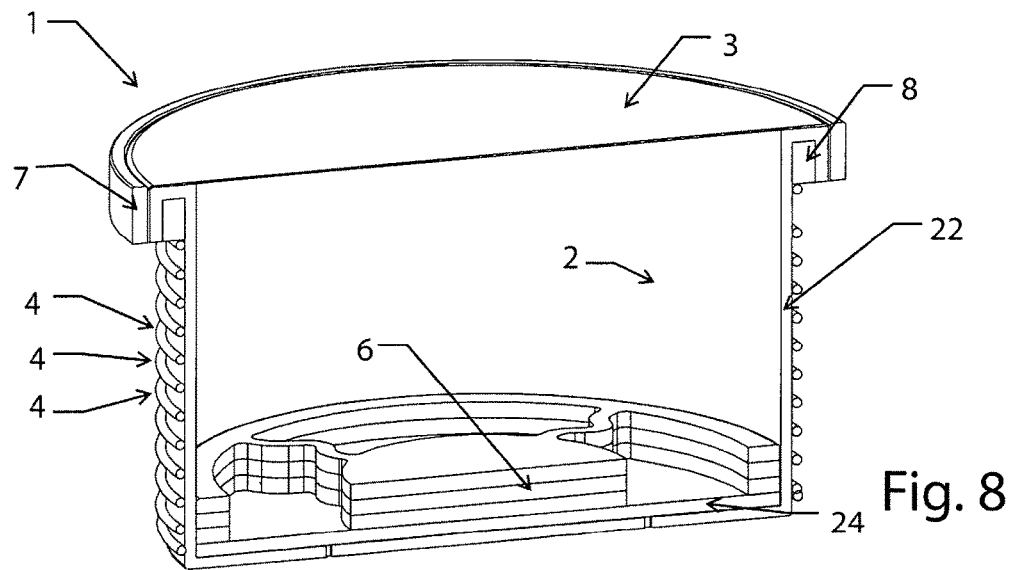
FIG. 8 is an isometric view of a fourth embodiment of biodegradable container or capsule according to the invention.

Making reference to FIG. 8, it is observed a section isometric view of a fourth embodiment of said biodegradable container or capsule 1, where said body 2 is fixed by the "Swiss frame" system, making said body 2 rotating outward about said inner ring 8 and fixing the assembly by said outer ring 7, tightening said inner ring 8 and said body 2, where said upper filter 3 is fixed by gluing or mechanical coupling between said outer ring 7 and said body 2 turned in on itself.

Figure 9:
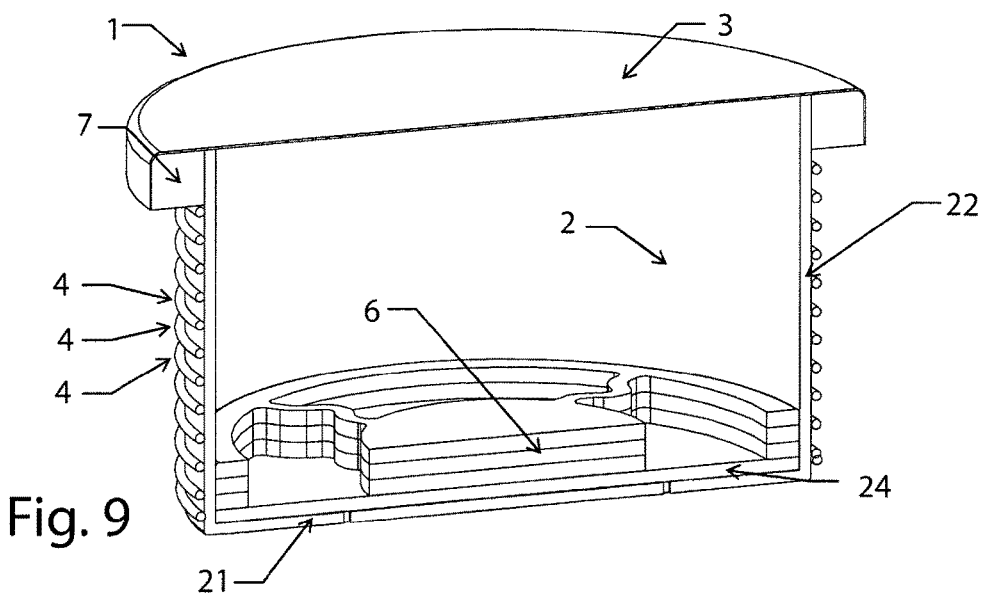
FIG. 9 is a section isometric view of the first embodiment shown in FIGS. 1-5.

Making reference to FIG. 9, it is observed a section isometric view of the first embodiment, as shown in FIGS. 1-5 of said biodegradable container or capsule 1, with said bottom 6 shaped and said inner filter 24 placed between said bottom 6 and said base 21.

Making reference to FIG. 10, it is observed a section isometric view of a fifth embodiment, on the basis of the first embodiment, of said biodegradable container or capsule 1, having said reinforcement means 4 placed between multilayer walls of said body 2.

Making reference to FIG. 11, it is observed a section isometric view of a sixth embodiment, on the basis of the first embodiment, of said biodegradable container or capsule 1, having said reinforcement means 4 comprised of a square mesh reticule gauze.

Making reference to FIG. 12, it is observed a section isometric view of a seventh embodiment, on the basis of the first embodiment, of said biodegradable container or capsule 1, having said reinforcement means 4 comprised of a sock placed about said body 2.

Figure 13:
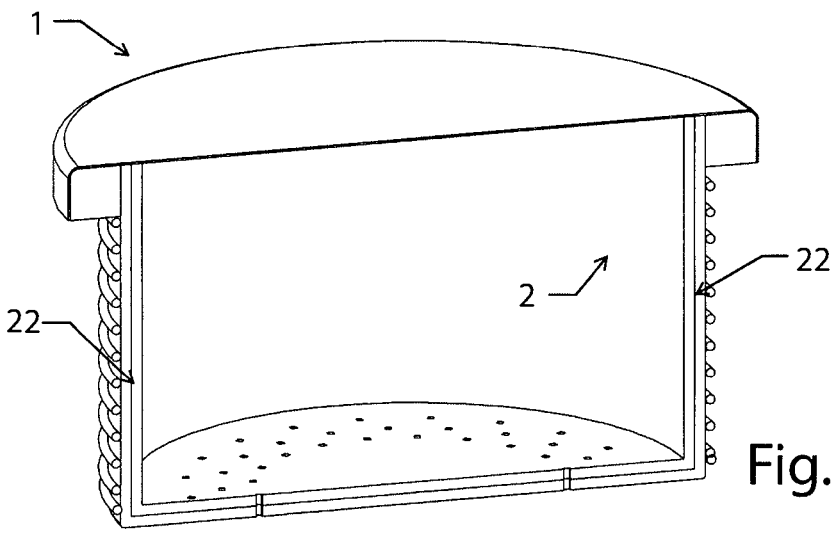
FIG. 13 is an isometric view of an eighth embodiment of biodegradable container or capsule according to the invention.

Making reference to FIG. 13, it is observed a section isometric view of an eighth embodiment, on the basis of the first embodiment, of said biodegradable container or capsule 1, having said body 2 made up of multilayer material.

Making reference to FIG. 14, it is observed a section isometric view of a ninth embodiment, on the basis of the first embodiment, of said biodegradable container or capsule 1, having said body 2 made up of multilayer material and said bottom 6 placed among the layers of said body 2.

Figure 15:
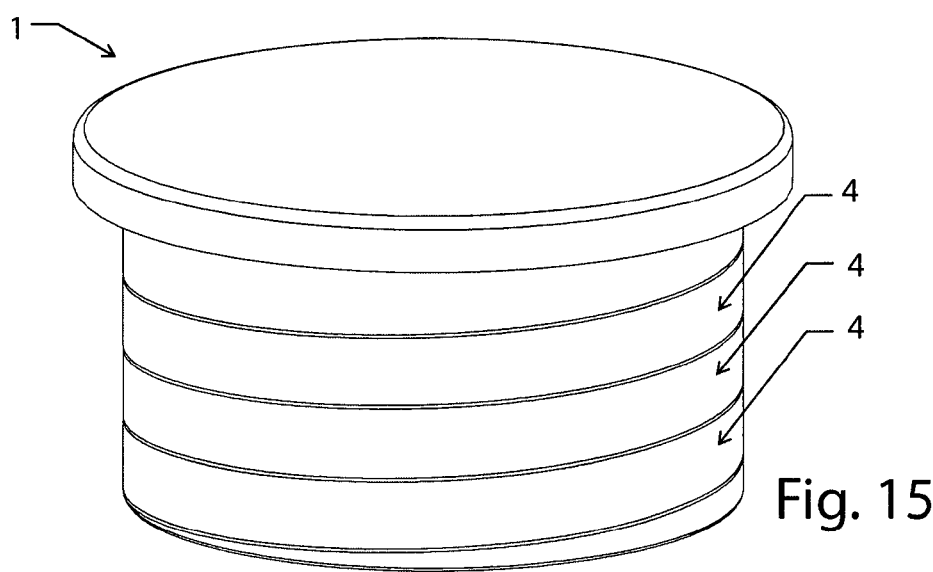
FIG. 15 is an isometric view of a tenth embodiment of biodegradable container or capsule according to the invention.

Further, making reference to FIG. 15, it is observed a section isometric view of a tenth embodiment of said biodegradable container or capsule 1 according to the invention which differs with respect to the embodiments described in the above in comprising reinforcement means made up of a biodegradable band or strip 4, preferably paper material, spiral wound so as to cover said body 2 of the container 1, or the whole container 1.

Said strip 4 can be glued, preferably by non-toxic glues, all along its surface on said body 2, or it can have glue applied only at the ends, being placed in correspondence of the upper and lower part of said body 2 or of said container 1. Alternately, it can be fixed by mechanical means.

Figure 16:
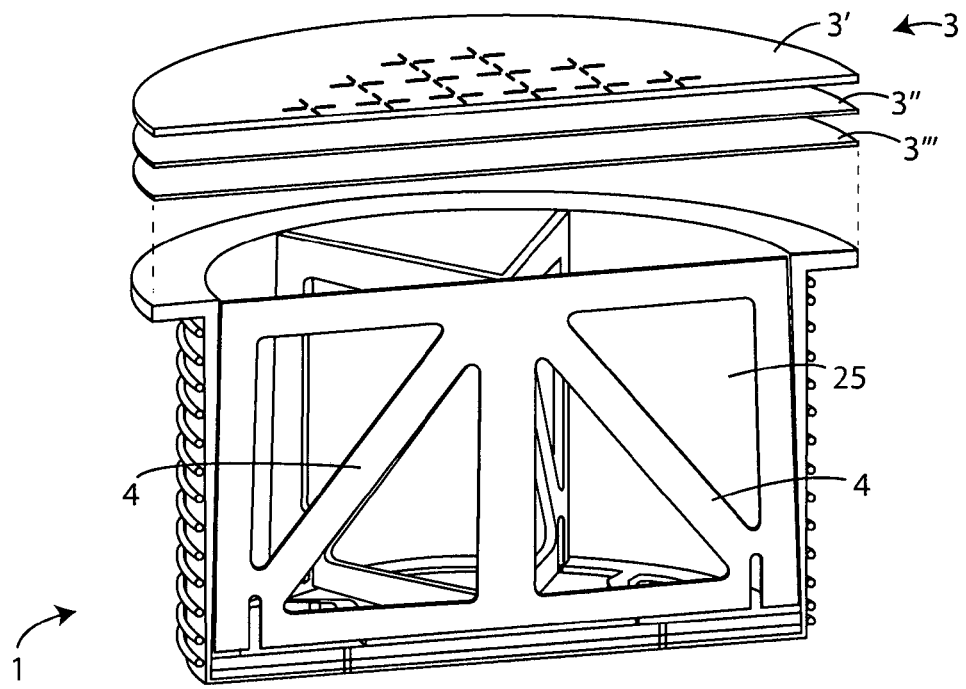
FIG. 16 is a section, partially exploded, isometric view of an eleventh embodiment of capsule according to the invention.

Observing now FIG. 16 of the enclosed drawings, it is shown an eleventh embodiment of the biodegradable container or capsule 1 according to the invention, particularly studied for cases where pressure on biodegradable container 1 is applied from outside.

In this case, reinforcement means 4 are comprised of a cross-shaped reinforcement that, in the embodiment shown has six radial elements, but that can even provide only 2, three, four or five radial elements. Further, always in the embodiment shown, said reinforcement means 4 radial elements extend all along the height of the biodegradable container or capsule 1, but it is to be understood that they can also extend only partially with respect to the height of the biodegradable container or capsule 1.

Further, said reinforcement means radial elements have inner openings 25, for making the product passing inside the biodegradable container or capsule 1.

Upper part 3 is comprised in this case of a pre-cut upper paperboard 3', a paper layer 3", particularly weighing 40 gr/m$^2$, and of a filter paper layer 3'''.

Observing FIG. 17, in this case, as in the embodiments shown in the following figures, both inner and outer reinforcement means are provided.

Figure 17:
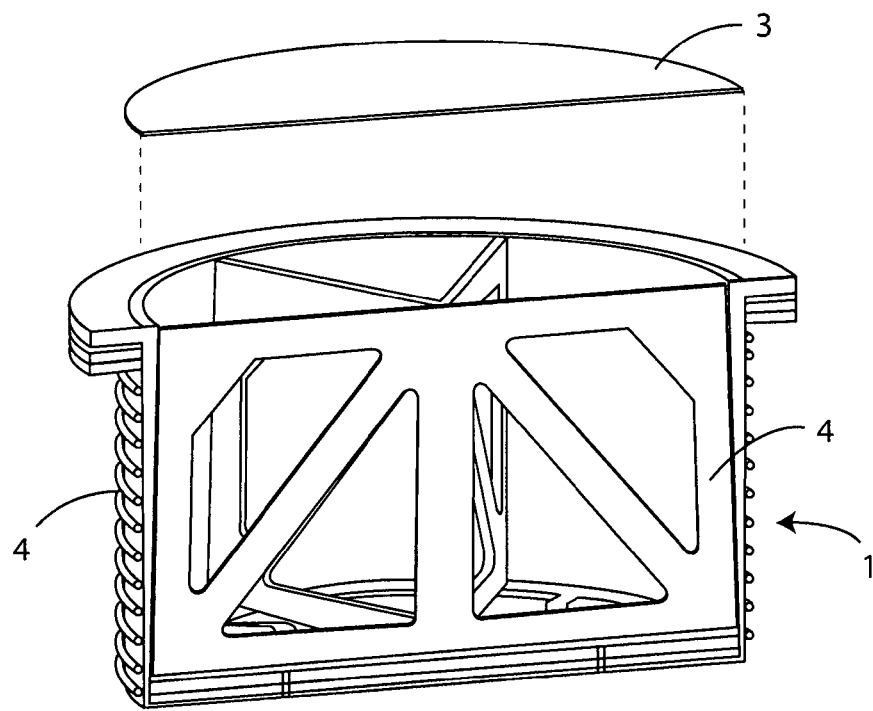
FIG. 17 is a section, partially exploded, isometric view of a twelfth embodiment of capsule according to the invention.

In the embodiment shown in FIG. 17, being it possible inserting PLA fibers (that is a natural and compostable material), or other weldable ecologic materials, it is possible welding filter paper 3 to the capsule body 1, in a much inner position to leave space to the shutter gasket pressing that capsule 1 and perfectly adhering to the head of the same capsule 1.

Figure 18:
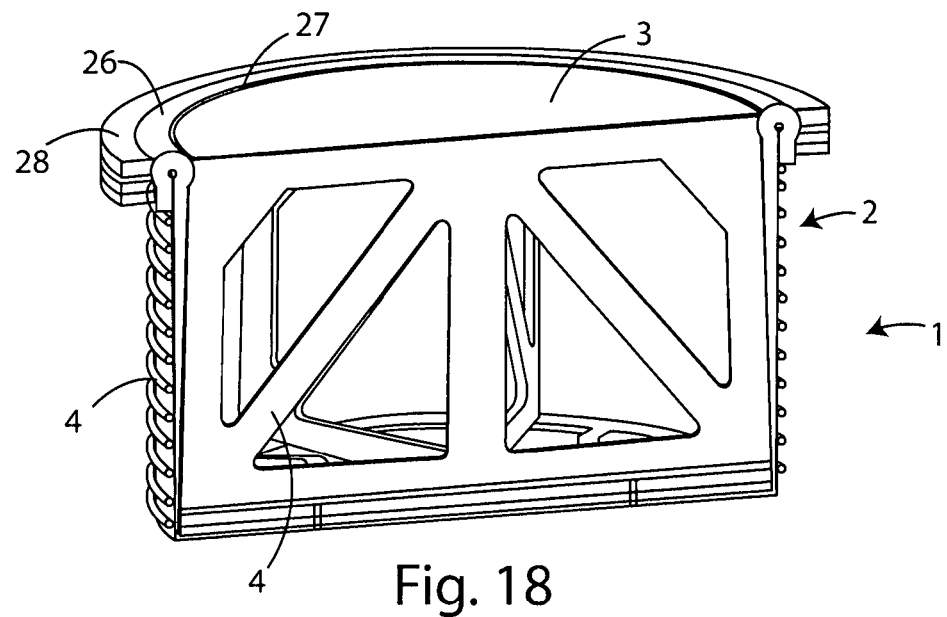
FIG. 18 is a section isometric view of a thirteenth embodiment of capsule according to the invention.
Figure 19:
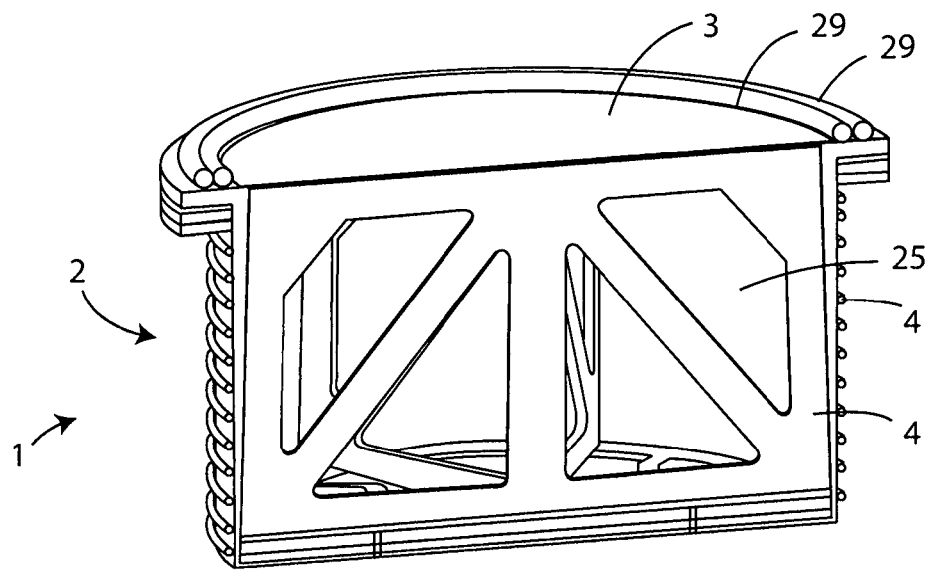
FIG. 19 is a section isometric view of a fourteenth embodiment of capsule according to the invention.

Coming now to observe FIG. 18, on the head of the capsule 1, body 2 rotates about a cone (cord) 26 and is tightened by two rings, respectively an inner ring 27 and an outer ring 28, pressing one against the other, being the capsule 1 body 2 cuff between them. Obviously, said cuff will remain above the collar of the capsule 1 head, also acting as upper gasket.

Figure 20:
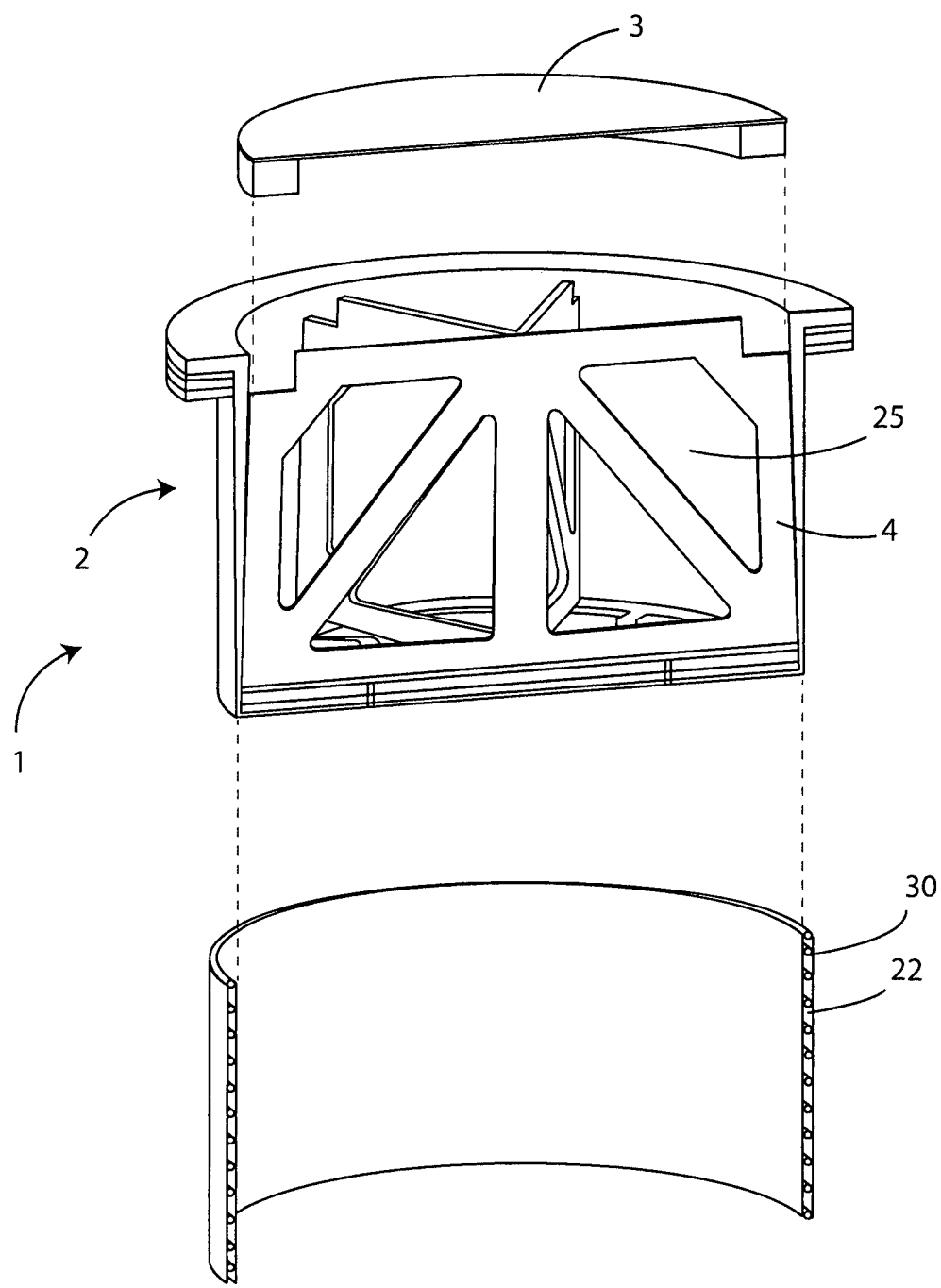
FIG. 20 is a section, partially exploded, isometric view of a fifteenth embodiment of capsule according to the invention.

Coming now to observe FIG. 20, it is illustrated the possibility of realizing separately said wall 22, reinforced by two paper or tissue layers and an inner wire spiral 30, or circles, or an additional gauze or band, having a sandwich configuration, so that it is industrially more simple applying the side wall 22 afterwards without realizing the reinforcement directly on the capsule 1 body 2. The same solution can be actuated realizing separately filter paper 3 and inserting the same within capsule 1 under a set pressure during last assembly phase of capsule 1 along an industrial plant.

Finally, observing FIGS. 21-24, further preferred embodiments are shown of the capsule 1 according to the invention.

Figure 21:
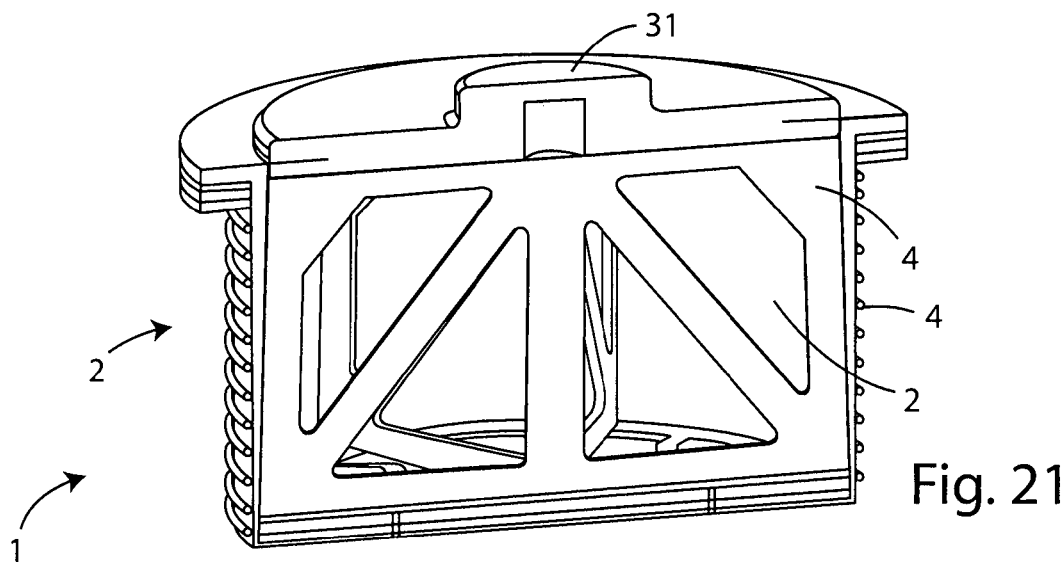
FIG. 21 is a section isometric view of a sixteenth embodiment of capsule according to the invention.

Particularly, in the embodiment of FIG. 21 a valve 31 is provided above, said valve being in some specific cases perforated by one or more needle injector from which water at the suitable temperature exits to make infusion.

Figure 22:
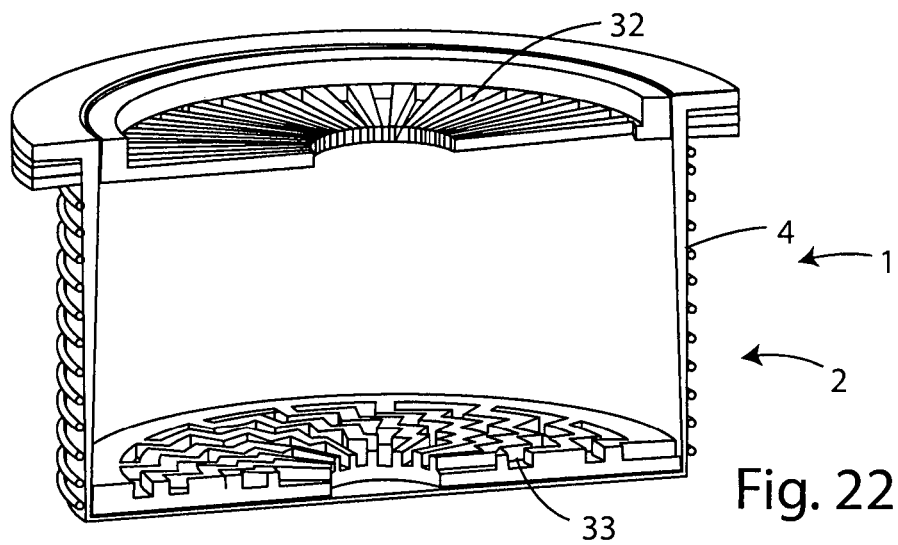
FIG. 22 is a section isometric view of a seventeenth embodiment of capsule according to the invention.

In the embodiment of FIG. 22 they are provided a track module 32, evenly addressing water all along the section to be emulsified, and/or a lower labyrinth or bubble-breaker passage 33, to improve creaminess of beverage, but their position could be inverted, or only one of them could be provided.

Figure 25:
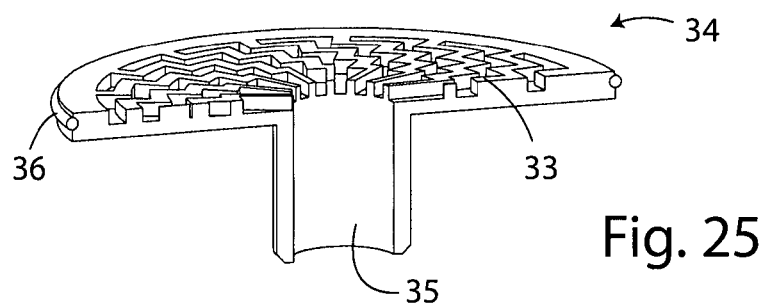
FIG. 25 is a section isometric view of a first embodiment of an additional element for capsule according to the invention.
Figure 26:
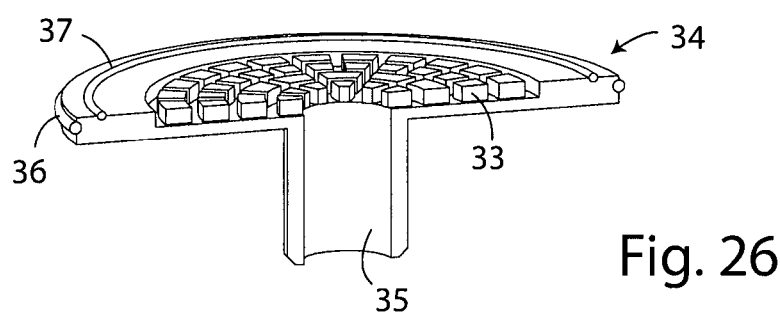
FIG. 26 is a section isometric view of a second embodiment of an additional element for capsule according to the invention.
Figure 27:
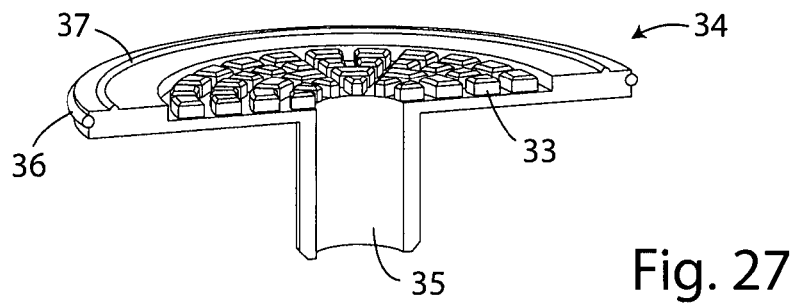
FIG. 27 is a section isometric view of a third embodiment of an additional element for capsule according to the invention.

Said labyrinth passage 33 provides a plurality of fluid obliged flowing channels, wherein path of each channel can be of different shapes (as also shown in FIGS. 25-27).

Figure 28:
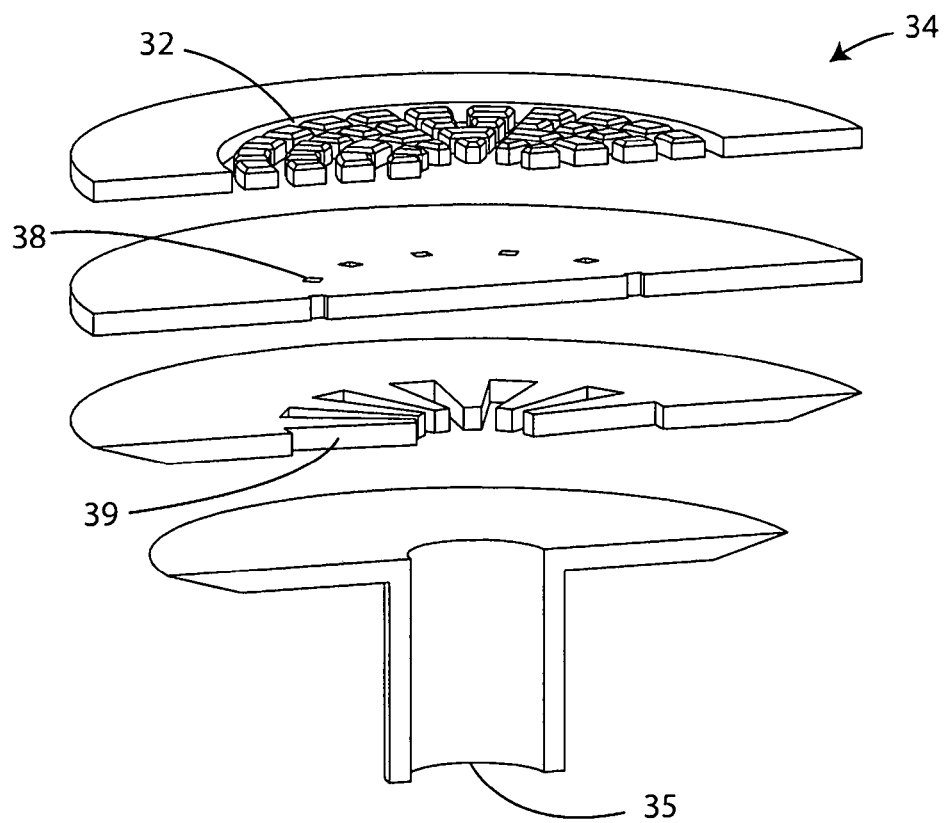
FIG. 28 is a section isometric view of a fourth embodiment of an additional element for capsule according to the invention.
Figure 29:
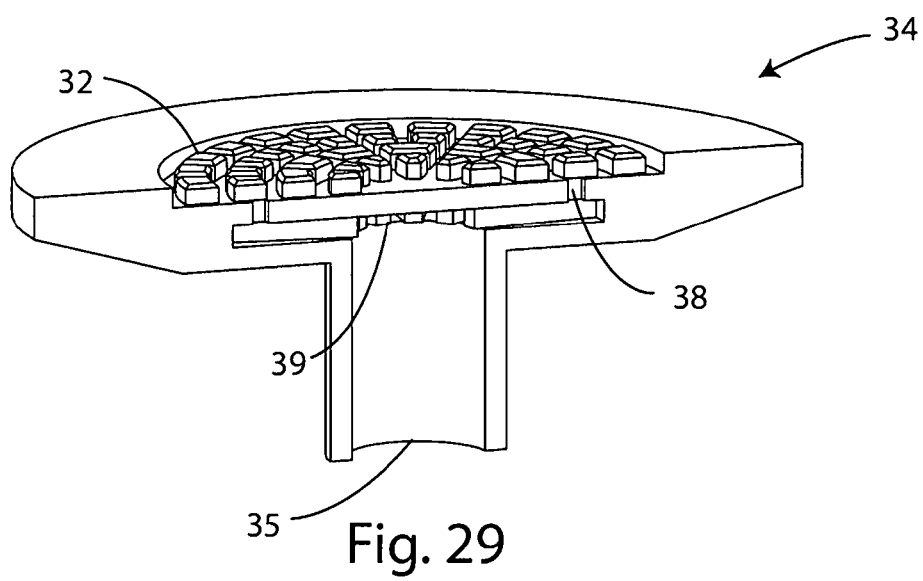
FIG. 29 is a section isometric view of the additional element of FIG. 28.

Further, upper portion of elements realizing labyrinth passage 33 can be blunt to facilitate flowing of beverage (as shown in FIGS. 28 and 29).

Figure 23:
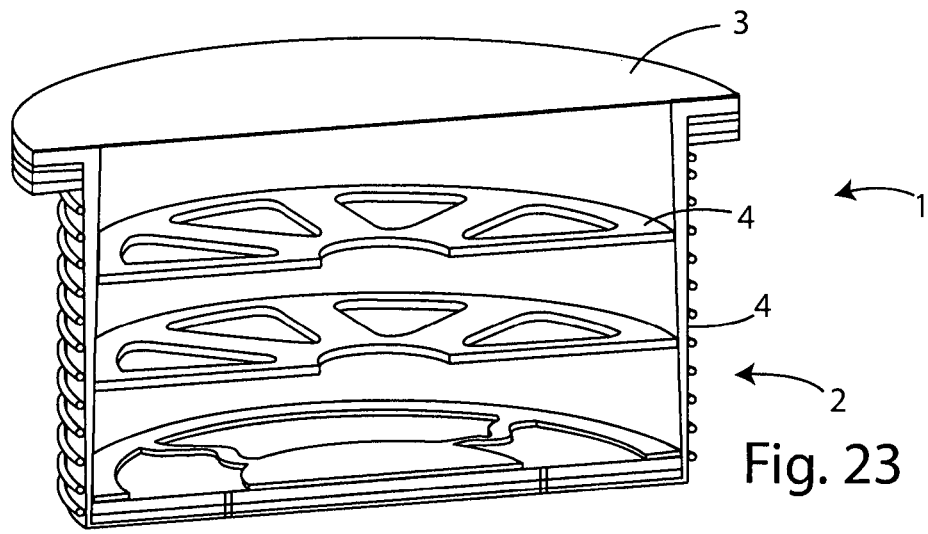
FIG. 23 is a section isometric view of an eighteenth embodiment of capsule according to the invention.

In the embodiment of FIG. 23, it is observed that inner reinforcements can be horizontal.

It is well evident that horizontal and vertical reinforcement can be provided at the same time.

This embodiment has the advantage of being simple and fast to be manufactured, always ensuring very good resistance mechanical features, necessary to withstand to stresses, particularly pressure, to which container according to the invention is subjected during the use inside beverage administration machines.

Figure 24:
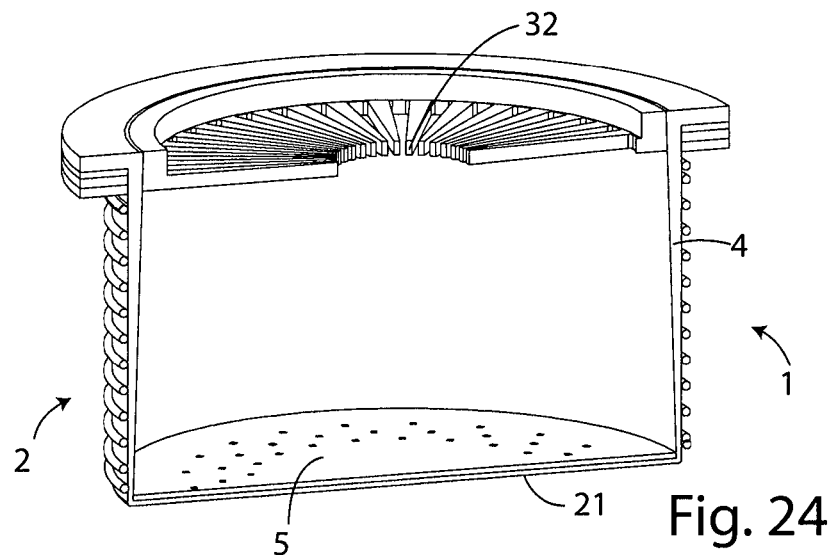
FIG. 24 is a section isometric view of a nineteenth embodiment of capsule according to the invention.

In the embodiment of FIG. 24, they are provided above a track module 32 as described in the above, evenly addressing water all along the section to be emulsified, and lower in correspondence of said base 21 a plurality of holes 5.

In order to improve creaminess of beverage obtained by passage through capsule 1 of FIG. 24 it can be provided the use of an additional element or outer disk 34 to be placed under said capsule 1 within the beverage administration device, particularly in correspondence of its base 21.

Said additional element 34 provides in its upper portion a labyrinth passage 33 as described in the above and as shown in FIGS. 25-27, and an opening, particularly a central channel 35, for administration of beverage after having passed through the labyrinth passage 33.

Further, said additional element 34 can provide a sealing element 36 in correspondence of the side surface of the upper portion (as shown in FIGS. 25-27) and/or a further sealing element 37, in correspondence of the upper surface of its upper portion.

Said sealing elements 36 and 37 can be external o-ring (as shown in FIGS. 25 and 26) or can directly be obtained on the surface of the outer disk 34 (as shown in FIG. 27).

Said additional element 34, in its different embodiments, can be used either along with one capsule 1 according to the invention or along with other capsules available on the market, in order to improve creaminess of the administered beverage.

Particularly, making reference to FIGS. 28 and 29, it is shown a fourth embodiment of the additional element 34, having a different stratification of the path for the beverage to be administered, and particularly a first outer layer comprising labyrinth passage 32, comprised of bubble-breaking projections, a second layer, under the first one, comprising a plurality of vertical holes 38 through which beverage passes, a third layer, under the second one, and comprising a plurality of slots or tracks 39, provided according to a sunburst arrangement, in flow communication with the central channel or spout 35 for final administration of the beverage. Also third layer can provide a plurality of further bubble-breaking projections to improve product creaminess.

Alternately, first layer can be a simple beverage collector, said beverage then passing through holes of the second layer to then passing within the third layer comprising the labyrinth path.

In further embodiments, said reinforcement means can comprise a plurality of strips 4 spiral wound on said body 2.

Further, in other embodiments, said one or more strips 4 are spiral wound on themselves or one above the other so as to realize a plurality of reinforcement layers.

Preferred embodiments of the present invention have been described in the above and variations have been suggested, but it is to be understood that modifications and/or changes can be introduced by those skilled in the art without departing from the relevant scope as defined in the enclosed claims.

The invention claimed is:

1. A biodegradable container for single dose or multi-dose administration of a beverage by injecting a fluid solution, under pressure through a preparation, wherein said pressure acts on the biodegradable container from outside the biodegradable container, said biodegradable container comprising:
   a body having a base, a substantially cylindrical side wall and an opening opposite to said base, said body forming a chamber for containing said preparation;
   an upper part coupled to said body in such a way as to obstruct said opening and prevent the escape of said preparation; and
   at least one reinforcement means associated with said substantially cylindrical side wall, and configured to oppose pressure acting on said biodegradable container during the injection of said fluid solution under pressure;
   wherein said at least one reinforcement means are provided internal to the chamber and are comprised of at least two radial elements extending vertically inside the body across a diameter of said body according to a cross-configuration, wherein each of the at least two radial elements extends across a diameter that extends through a centerpoint of the biodegradable container adjacent to said opening of said body.

2. The biodegradable container according to claim 1, wherein said at least two radial elements are provided vertically or horizontally inside said body.

3. The biodegradable container according to claim 2, wherein 3, 4, 5, or more of said radial elements are provided inside said body.

4. The biodegradable container according to claim 2, wherein said at least one reinforcement means completely extends along an inner height of said body.

5. The biodegradable container according to claim 4, wherein said upper part is comprised of a slit upper cardboard, a layer of paper weighing 40 gr/m$^2$, and of a filter paper layer.

6. The biodegradable container according to claim 1, wherein said substantially cylindrical side wall is reinforced by wire and two layers, and wherein said wire and said substantially cylindrical side wall is disposed between said two layers.

7. The biodegradable container according to claim 1, wherein the body is made of wood derivative materials.

8. An assembly comprising said biodegradable container according to claim 1 and an element to be associated with said base of said biodegradable container, said element comprising a labyrinth passage for forced passage of said beverage from said biodegradable container and at least one opening connected with said labyrinth passage for administration of said beverage.

9. The assembly according to claim 8, wherein said element to be associated with said base of said biodegradable container comprises a first outer layer, a second intermediate layer in fluid communication with said first outer layer and a third layer in fluid communication with the second intermediate layer and with said at least one opening connected with said labyrinth passage, and in that said labyrinth passage is provided on at least one of said first outer layer and said third layer.

10. The biodegradable container according to claim 1, wherein said base is shaped.

11. The biodegradable container according to claim 1, wherein a cord is provided between a plurality of rings, and wherein said rings tighten the cord against said upper part.

12. The biodegradable container according to claim 1, wherein a seal is provided above said body of the biodegradable container.

13. The biodegradable container according to claim 1, wherein a perforable valve is provided above said at least two radial elements.

14. The biodegradable container according to claim 1, wherein a track module is provided above said base and routes water evenly along a section to be emulsified.

15. The biodegradable container according to claim 1, wherein a labyrinth passage comprising a plurality of fluid flow channels is provided above said base.

\* \* \* \* \*

UNITED STATES PATENT AND TRADEMARK OFFICE
CERTIFICATE OF CORRECTION

| | |
|---|---|
| PATENT NO. | : 10,940,986 B2 |
| APPLICATION NO. | : 15/308998 |
| DATED | : March 9, 2021 |
| INVENTOR(S) | : Matteo Rossomando et al. |

It is certified that error appears in the above-identified patent and that said Letters Patent is hereby corrected as shown below:

On the Title Page

Item (30) Foreign Application Priority Data, Line 1:
"RM2014A0226" should be changed to -- RM2014A000226 --

Signed and Sealed this
Twentieth Day of August, 2024

Katherine Kelly Vidal
*Director of the United States Patent and Trademark Office*